(12) United States Patent
Tarasinski

(10) Patent No.: US 7,311,627 B2
(45) Date of Patent: Dec. 25, 2007

(54) DRIVE ARRANGEMENT FOR THE DRIVE OF ATTACHED IMPLEMENTS FOR A VEHICLE

(75) Inventor: Nicolai Tarasinski, Frankenthal (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/786,534

(22) Filed: Feb. 25, 2004

(65) Prior Publication Data

US 2004/0204276 A1    Oct. 14, 2004

(30) Foreign Application Priority Data

Apr. 8, 2003   (DE) ................... 103 15 937

(51) Int. Cl.
   *F16H 37/06*   (2006.01)
(52) U.S. Cl. ................ 475/5; 475/10; 477/4; 180/65.4
(58) Field of Classification Search .............. 475/5, 475/10; 477/3, 4; 180/65.4
   See application file for complete search history.

(56) References Cited

U.S. PATENT DOCUMENTS

| | | | | |
|---|---|---|---|---|
| 5,577,973 A * | 11/1996 | Schmidt | .......... | 475/5 |
| 5,669,842 A * | 9/1997 | Schmidt | .......... | 475/5 |
| 5,730,676 A * | 3/1998 | Schmidt | .......... | 475/5 |
| 5,937,697 A * | 8/1999 | Matsufuji | .......... | 74/11 |
| 5,967,940 A * | 10/1999 | Yamaguchi | .......... | 477/107 |
| 6,045,485 A * | 4/2000 | Klinger et al. | .......... | 477/203 |
| 6,205,385 B1 * | 3/2001 | Stelzle et al. | .......... | 701/50 |
| 6,383,106 B1 * | 5/2002 | Kashiwase | .......... | 475/5 |
| 6,455,947 B1 * | 9/2002 | Lilley et al. | .......... | 290/40 C |
| 6,551,208 B1 * | 4/2003 | Holmes et al. | .......... | 475/5 |
| 6,607,466 B2 * | 8/2003 | Bordini | .......... | 477/3 |
| 6,662,890 B2 * | 12/2003 | Schmidt | .......... | 180/65.3 |
| 6,726,592 B2 * | 4/2004 | Kotani | .......... | 477/4 |
| 2004/0084233 A1 * | 5/2004 | Wakuta et al. | .......... | 180/65.2 |
| 2004/0149462 A1 * | 8/2004 | Okamoto et al. | .......... | 172/292 |
| 2006/0021455 A1 * | 2/2006 | Seipold | .......... | 74/15.6 |

FOREIGN PATENT DOCUMENTS

| | | |
|---|---|---|
| DE | 697 02 806 | 3/1997 |
| DE | 197 49 074 | 11/1997 |
| DE | 197 49 074 A 1 | 5/1999 |
| EP | 12 05 338 | 10/2001 |
| WO | WO 94/07056 | 9/1993 |

* cited by examiner

*Primary Examiner*—David D. Le

(57) ABSTRACT

The present invention concerns a drive arrangement for the drive of attached implements for a vehicle, particularly an agricultural or industrial utility vehicle, with a combination gearbox, an electrical machine and a power take-off shaft, where a gearbox interface of the combination gearbox can be driven by an internal combustion engine and where the electrical machine is connected with a second gearbox interface of the combination gearbox. In order to make available a variable power take-off shaft rotational speed that is independent of the rotational speed of the internal combustion engine, the drive arrangement according to the invention is characterized by the fact that the power take-off shaft is connected with a third gearbox interface of the combination gearbox. Furthermore the present invention concerns a vehicle with such a drive arrangement.

9 Claims, 4 Drawing Sheets

DRIVE ARRANGEMENT FOR THE DRIVE OF ATTACHED IMPLEMENTS FOR A VEHICLE

FIELD OF THE INVENTION

The invention concerns a drive arrangement for the drive of attached implements for a vehicle, in particular an agricultural or industrial utility vehicle, with a combination gearbox, an electrical machine and a power take-off shaft, where a gearbox interface of the combination gearbox can be driven by an internal combustion engine and where the electrical machine is connected to a second gearbox interface of the combination gearbox. Furthermore the present invention concerns a vehicle with such a drive arrangement.

BACKGROUND OF THE INVENTION

From DE 197 49 074 A1 an agricultural utility vehicle with a mechanical-electrical torque division gearbox is known. Here an internal combustion engine is connected with a first gearbox interface of a combination gearbox and an electrical machine is connected with a further gearbox interface of the combination gearbox. The combination gearbox is used for the forward propulsion drive of the utility vehicle. A generator driven by the engine drive shaft is provided, that supplies the electrical machine with electrical power. Thereby a mechanical-electrical torque division can be achieved, that makes possible an infinitely variable forward propulsion drive of the utility vehicle, where a higher efficiency can be attained in contrast to a conventional torque division gearbox configured as a hydrostatic drive. On the other hand the power take-off shaft is connected to the internal combustion engine over a purely mechanical gearbox, so that the power take-off shaft rotational speed is in a fixed relationship to the rotational speed of the internal combustion engine.

Operating implements can be adapted to an agricultural utility vehicle, for example, to a tractor, that must be driven mechanically over a power take-off shaft of the utility vehicle. Such an operating implement is, for example, a non-self propelled rotobaler. In the sense of the present invention the drive interface is understood to mean an attached implement driven by the vehicle, that makes a mechanical torque available.

When operating implements that must be operated at a constant input rotational speed, are adapted to a vehicle with a power take-off shaft according to DE 197 49 074 A1, the internal combustion engine must be operated at a constant rotational speed for trouble-free operation of the operating implement, since the power take-off shaft is in a fixed rotational speed relationship to the rotational speed of the internal combustion engine. Thereby an infinitely variable gearbox must be provided in the drive-line of the main propulsion drive, in case that a change in the propulsion speed of the vehicle is to be performed. This is expensive and costly since this requires an infinitely variable power shift gearbox.

In case that operating implements are to be attached to a vehicle which must be operated at a power take-off shaft speed proportional to the forward propulsion velocity of the vehicle, a trouble free operation is only possible if the rotational speed of the internal combustion engine is actually proportional to the forward propulsion velocity. If the wheels of the vehicle spin, for example, on a tractor in the field, the forward propulsion velocity of the vehicle is reduced. In case the power take-off shaft speed remains unchanged, the proportionality of the power take-off shaft speed to the forward propulsion velocity is changed and the rotational speed of the operating implement will increase relative to the forward propulsion velocity. In sowing machines this can have the effect that the plants are planted at irregular intervals.

The task underlying the invention is seen in the need to define a drive arrangement for attached implements for a vehicle of the aforementioned type through which the above problems are overcome. In particular a constant power take-off shaft rotational speed should be made available despite a varying rotational speed of the internal combustion engine. Furthermore with a generally constant internal combustion engine rotational speed a variable power take-off shaft rotational speed should be generated.

SUMMARY OF THE INVENTION

According to the invention a drive arrangement of the type noted initially is characterized by the power take-off shaft that is connected with a third gearbox interface of the combination gearbox. Thereby an attached implement requiring a constant input rotational speed can be operated at an essentially constant power take-off shaft rotational speed by a variation of the internal combustion engine rotational speed. The power take-off shaft rotational speed is held constant by the electrical machine that is operated or controlled in such a way that it equalizes a variation in the rotational speed of the internal combustion engine through the combination gearbox. The electrical machine could, for example, be supplied by a battery or a dynamo. Thereby the vehicle speed or the rotational speed of the internal combustion engine can also be varied to great advantage without an infinitely variable gearbox in the vehicle driveline, where the power take-off shaft rotational speed can be held constant with the aid of the electrical machine.

But a power take-off shaft rotational speed proportional to the vehicle speed can be realized despite spinning vehicle wheels by means of the invention, in that the electrical machine is operated or controlled in such a way that the power take-off shaft rotational speed is proportional to the actual vehicle speed. For this purpose a vehicle speed sensor could be provided that detects the actual vehicle speed. Therefore to great advantage fundamentally no mechanical power take-off shaft gearbox is required, because a variation of the rotational speed of the power take-off shaft can be attained with the drive arrangement according to the invention.

An overload capacity of the power take-off shaft or the power take-off shaft driveline is provided to great advantage by the drive arrangement according to the invention, since any possible torque peaks transmitted from the attached implement to the power take-off shaft driveline can be absorbed by the electrical machine and thereby compensated. For this purpose the electrical machine must be controlled, if necessary, by a corresponding control arrangement. In this connection the power take-off shaft driveline is understood to include particularly the components arranged between the power take-off shaft and the internal combustion engine.

According to a preferred embodiment of the invention the combination gearbox is provided with a circulating gearbox, in particular a planetary gearbox. Preferably the planetary gearbox is designed in such a way that the internal combustion engine as well as the electrical machine operate in a region of favorable efficiency, in which high torques can also be transmitted to the power take-off shaft. Here a gearbox interface of the planetary gearbox operating as input is connected to the internal combustion engine. A gearbox interface of the planetary gearbox operating as input as well as output is connected with the electrical machine. Finally a gearbox interface of the planetary gearbox operating as output is connected to the power take-off shaft.

In a very particularly preferred embodiment a brake is provided with which the power take-off shaft can be stopped. In case that the combination gearbox is driven by the internal combustion engine over the gearbox interface and the power take-off shaft is stopped by the brake, the entire mechanical energy supplied to the combination gearbox is supplied to the electrical machine. Thereby electrical energy can be generated to great advantage with the electrical machine, that can be conducted, for example, to electrical devices or to a battery. In so far that this is not an electrical machine driven by an internal combustion engine in long-term operation, for example, in the form of a conventional dynamo of a vehicle, but an electrical machine that can be activated if required by the stopping of the brake of the power take-off shaft interacting with the combination gearbox. Since a power take-off shaft is usually designed for the transmission of high torques, the electrical machine can also generate correspondingly high electrical power to great advantage with corresponding dimensioning. In case that the power take-off shaft is stopped with the brake and thereby the gearbox interface of the power take-off shaft is stopped, the gearbox interface connected with the electrical machine operates as output.

In a particularly preferred embodiment a further electrical machine is provided, that can be driven directly or indirectly by the internal combustion engine. The further electrical machine could be connected over a positive locking connection with the drive shaft of the internal combustion engine. A direct arrangement of the electrical machine on the drive shaft could also be provided as described, for example, by DE 197 49 074 A1. In so far as the further electrical machine as is the electrical machine can be driven to great advantage with a high torque on the basis of the direct or indirect mechanical drive by the internal combustion engine, so that, for example, electrical devices with high power output can be operated.

Particularly for the operation of electrical devices that require a large amount of electrical power, the electrical machine and the further electrical machine can be operated as generator. For this purpose finally the electrical machine or the further electrical machine must be switched correspondingly, so that, for example, the rotary current generated by both electrical machines can be conducted directly to electrical devices that are, for example, in the form of rotary current motors. If a particularly high level of electrical power is required the power take-off shaft can be stopped by the brake, whereby the electrical machine is driven with maximum rotational speed. The further electrical machine is driven directly or indirectly by the internal combustion engine, and both electrical machines can be operated as generator.

The electrical machine or the further electrical machine could also be operated as electric motor. Preferably the electrical machine is operated as an electric motor. In this case the electrical machine as well as the internal combustion engine supplies power to the combination gearbox which delivers the combined power output to the power take-off shaft. Here the electrical machine can be operated in two directions of torque, whereby the rotational speed of the power take-off shaft can be varied to great advantage over a wide rotational speed range. In this way an infinitely variable controlled power take-off shaft operation is possible with the mechanical-electrical torque division gearbox. However, the further electrical machine can also be operated as an electric motor, in order to permit, for example, mechanical feedback of the energy generated by it.

Preferably a rectifier is associated with the electrical machine and/or the further electrical machine, with which each of the electrical machines can be switched in both directions of rotation and/or both directions of torque (four quadrant operation). The rectifier preferably converts the alternating current generated by the electrical machine operating as generator into direct current, and feeds it into a direct current network or into an electrical storage unit. In case that an electrical machine is to be operated as electric motor, the rectifier converts the direct current taken out of the direct current network or out of the electrical storage unit into alternating current or rotary (three phase) current, whereby the electrical machine can be operated as an alternating or rotary current machine.

The drive arrangement can be applied in a multiplicity of ways and can be variable if a control arrangement is provided that controls the internal combustion engine or a control of the internal combustion engine, the electrical machine, the further electrical machine, at least one rectifier and/or the brake. This control arrangement can configure, for example, the control arrangement by releasing the brake and by a configuration of the rectifiers of the electrical machine to an electric motor and the further electric machine to a generator in such a way that a torque division mechanical-electrical gearbox is realized. Here a part of the torque generated by the internal combustion engine and another part of the torque generated by the electrical machine is transmitted to the power take-off shaft over the combination gearbox. Thereby a generally constant power take-off shaft rotational speed can be made available with a varying rotational speed of the internal combustion engine in a very particularly advantageous manner. Moreover a variable power take-off shaft rotational speed can be generated at a generally constant internal combustion engine rotational speed.

Thereby two fundamentally different types of attached implements that can be adapted to a tractor and can be operated with the drive arrangement according to the invention to very particular advantage: On the one hand these are operating implements that require a constant input rotational speed, for example, mower heads or non-self-propelled rotobalers. On the other hand these are operating implements that require an input rotational speed that varies as a function of the tractor velocity or the path covered. Examples of the latter are sowing machines.

In order to provide an efficient control of the drive arrangement according to the invention the data of the condition of the internal combustion engine, the power take-off shaft, of the electrical machine and/or the further electrical machine can be detected by the control arrangement. The data of the condition are preferably detected by sensors. The data of the condition of the internal combustion engine are usually known to a control arrangement of the internal combustion engine and accordingly need only be transmitted to the control arrangement of the drive arrangement. The data of the condition of the power take-off shaft can be detected by means of a rotational speed sensor arranged on the power take-off shaft, and transmitted to the control arrangement. The data of the condition of the electrical machines can be detected by means of a current or voltage measurement and transmitted to the control arrangement. Thereby a control circuit can be attained for the adjustment of the power take-off shaft rotational speed together with the sensors and the control arrangements.

Very generally when the brake is released the electrical machine, the further electrical machine and the combination gearbox can be combined into an infinitely variable torque division gearbox for the power take-off shaft. As already indicated thereby the further electrical machine can be operated as generator and the electrical machine as electric motor. Alternatively the electrical machine can also be operated as generator and the further electrical machine operated as electric motor, where in this case a mechanical feedback over the electric line occurs.

Now on the basis of the invention on the one hand a required constant rotational speed of the power take-off shaft can be made available on the basis of the drive arrangement according to the invention even with an internal combustion engine operated with variable rotational speed. On the other hand with the drive arrangement according to the invention even with a constant rotational speed of the internal combustion engine a variable speed of the power take-off shaft can be made available. Therefore it is conceivable that the control arrangement controls the electrical machine and the further electrical machine in such a way that an optimization goal deposited in memory can be attained. Such an optimization goal could be, for example, the lowest possible fuel consumption of the internal combustion engine or the lowest possible noise emission.

Now an operating implement connected to the power take-off shaft can briefly develop torque peaks and produce torsional vibrations that are transmitted by the power take-off shaft to the internal combustion engine over the combination gearbox. This results in jerk-like or periodic loads on the internal combustion engine, that impair the operating comfort. To avoid the transmission of torsional vibrations over the combination gearbox to the power take-off shaft, in a particularly preferred embodiment, the control arrangement, the electrical machine and/or, if necessary, the further electrical machine are controlled in such a way that torsional vibrations in a power take-off shaft driveline can be damped. In this connection the power take-off shaft driveline is understood to include the components arranged between the power take-off shaft and the internal combustion engine, such as, for example, the combination gearbox, the electrical machine and the further electrical machine. On the basis of this control arrangement the electrical machine and/or the further electrical machine absorbs torsional vibrations or damps these, so that a transmission of torsional vibrations to the internal combustion engine is largely avoided.

In actual fact the transmission of the combination gearbox could be designed in such a way that the rotational speeds required in the principal operating region of the power take-off shaft lie in regions of optimum efficiency of the internal combustion engine. Preferably the transmission of the combination gearbox could also be designed in such a way that a minimum power proportion of the electrical and/or the further electrical machine must be made available. Thereby electrical losses can be minimized to great advantage and the entire system can be operated at optimum efficiency.

With the drive arrangement according to the invention a determination of the torque of the power take-off shaft is possible to particular advantage without the cost of further configurations by the use of the torque generated by the electrical machine for this determination. Since the characteristics of the combination gearbox—in particular its gear ratio—are known and the torque transmitted to the electrical machine can easily be determined—for example, by a current measurement—the torque transmitted to the power take-off shaft can be determined directly. The determination of the torque of the power take-off shaft is possible, independently of the question whether the electrical machine operates as generator or as motor.

In a preferred embodiment the electrical machine and the further electrical machine are arranged close by each other in space. Thereby a compact and space-saving arrangement can be achieved and the electrical cables can be held as short as possible. Preferably both electrical machines can be cooled by a common cooling arrangement. Thereby only a correspondingly configured cooler body is required, that cools the two electrical machines arranged close to each other. Thereby because of a compact arrangement a separate cooler body for the second machine can be omitted. Hence the coolant lines need be conducted only to this single cooler body, which further simplifies the entire cooling system and reduces its cost.

Now the electrical machine and/or the further electrical machine can each operate as generator and supply an electrical device. In this way, for example, an electric resistance heater could be operated, that heats a coolant circuit of the internal combustion engine whereby, for example, the cooling circuit of the internal combustion engine could, for example, be brought to its operating temperature more rapidly shortly after starting. Moreover an electrical device that can be connected to an electrical interface could be supplied. The electrical interface could include, for example, a receptacle that makes 220 volt alternating current available.

The drive arrangement according to the invention could be implemented in a particularly preferred embodiment in a vehicle, particularly in an agricultural or an industrial utility vehicle.

In such a vehicle a control of the rotational speed of a power take-off shaft could be provided that is a function of the vehicle speed. Such a "path power take-off shaft" is provided particularly for tractors for the adaptation of operating implements that require an input rotational speed that is a function of the vehicle speed, for example, a sowing machine.

In a preferred embodiment the electrical machine and/or the further electrical machine can be configured for the braking of the vehicle, particularly for long duration braking. In that way, for example, the electrical power generated by both electrical machines could be conducted to an electrical resistance heater. In particular during extended downhill operation a long duration braking arrangement without wear for the vehicle could be made available that finally improves the safety and reliability of the vehicle.

In a very particularly preferred embodiment the vehicle is provided with at least one vehicle wheel driven by an electric motor, and the electrical energy generated by an electrical machine operating in generator operation feeds the electric motor of the vehicle wheel. For example, the vehicle wheels of the front axle could be driven electrically, while the internal combustion engine—if necessary drives the wheels of the rear axle over an intervening gearbox. Here, to a very particular advantage, the rotational speed of the electrically driven wheels of the front axle of the vehicle can be infinitely variable, provided that a sufficient amount of electrical energy is available.

Fundamentally during the pure vehicle operation the power take-off shaft could be stopped with the brake. This is the case particularly when no attached implement is adapted to the vehicle that is configured, for example, as a tractor and a power take-off shaft operation is not needed.

When the brake is stopped the mechanical energy supplied by the internal combustion engine into the combination gearbox is converted almost without any losses by means of the electrical machine that can be operated as generator.

In general, the present invention concerns a drive arrangement for the drive of attached implements for a vehicle, particularly an agricultural or industrial utility vehicle, with a combination gearbox, an electrical machine and a power take-off shaft, where a gearbox interface of the combination gearbox can be driven by an internal combustion engine and where the electrical machine is connected with a second gearbox interface of the combination gearbox. In order to make available a variable power take-off shaft rotational speed that is independent of the rotational speed of the internal combustion engine, the drive arrangement according to the invention is characterized by the fact that the power take-off shaft is connected with a third gearbox interface of the combination gearbox. Furthermore the present invention concerns a vehicle with such a drive arrangement.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
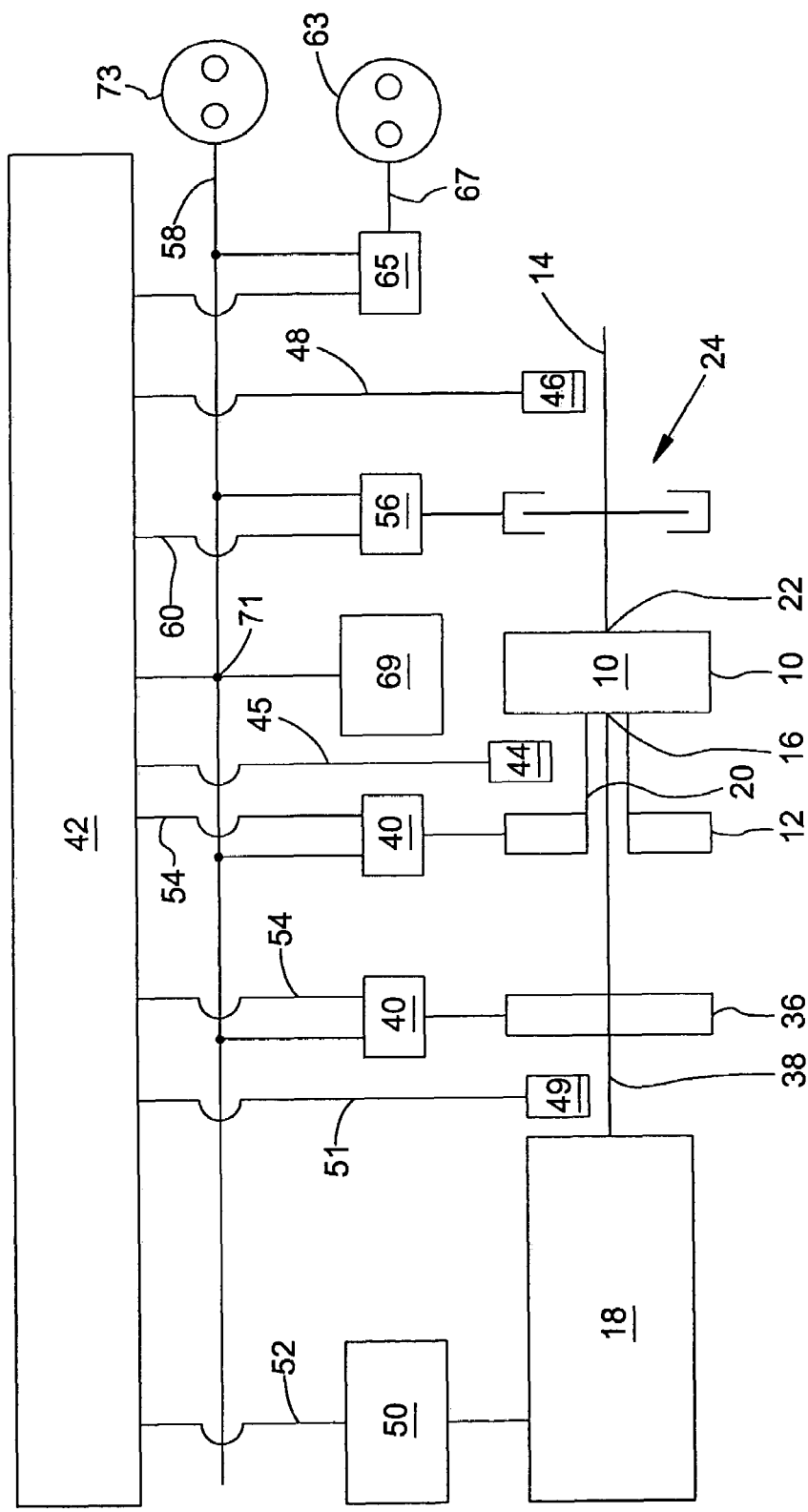
FIG. 1 is a schematic representation of the first embodiment of the present invention.

FIG. 1 shows a drive arrangement for the drive of attached implements for a vehicle. Such a vehicle may, for example, be an agricultural or industrial utility vehicle, preferably this could be a tractor. An internal combustion engine 18 is connected with a combination gearbox 10 over a drive shaft 38. The combination gearbox 10 is connected to a power take-off shaft 14 with which attached implements for the vehicle can be driven. An electrical machine 12 is also connected to the combination gearbox 10. Thereby the drive arrangement includes a combination gearbox 10, an electrical machine 12 and a power take-off shaft 14.

The internal combustion engine 18 drives a Diesel engine a gearbox interface 16 of the combination gearbox 10 in particular. The electrical machine 12 is connected with a second gearbox interface 20 of the combination gearbox 10. The power take-off shaft 14 is connected with a third gearbox interface 22 of the combination gearbox 10. Due to this arrangement the rotational speed of the power take-off shaft can be controlled independently of the rotational speed of the internal combustion engine 18, in that the electrical machine 12 is driven, for example, as an electric motor and transmits the torque generated by it to the combination gearbox 10.

A brake 24 is provided with which the power take-off shaft 14 can be stopped. When the power take-off shaft 14 is stopped the torque delivered to the gearbox interface 16 by the internal combustion engine 18 is transmitted over the combination gearbox 10 to the electrical machine 12, which, for its part, is then operated as generator and generates electrical current. In so far by corresponding switching of the electrical machine 12 and by a simple measure, that is, the stopping of the brake, electrical current can be generated that can be made available to electrical devices.

A further electrical machine 36 is provided that is driven by the internal combustion engine 18 directly over the shaft 38. The further electrical machine 36 preferably has a rated power output of approximately 20 kW. The rated power output of the electrical machine 12 amounts to approximately 30 kW, that of the internal combustion engine 18 preferably approximately 100 kW.

Both the electrical machine 12 as well as the further electrical machine 36 can be operated as generator. Furthermore the electrical machine 12 or the further electrical machine 36 can be operated as electric motor.

Each of the electrical machine 12 and the electrical machine 36 is associated with a rectifier 40, with which each of the electrical machines 12, 36 can be switched in both directions of rotation and/or directions of torque, so that a four-quadrant operation of the electrical machines 12, 36 is possible.

A control arrangement 42 is provided that controls the internal combustion engine 18, the electrical machine 12, the further electrical machine 36, the rectifiers 40 and the brake 24. The control arrangement 42 can be connected with the individual components over a bus system of the vehicle, which is indicated by the elongated shape of the control arrangement 42 in FIG. 1.

The data of the condition of the internal combustion engine 18, the power take-off shaft 14, the electrical machine 12 and the further electrical machine 36 can be detected by the control arrangement 42. For this purpose, for example, a rotational speed sensor 46 is provided on the power take-off shaft 14, which generates a rotational speed signal and conducts it to the control arrangement 42 over the connecting line 48. The data of the condition of the internal combustion engine 18 are known to the control arrangement 50 of the internal combustion engine 18 and are conducted to the control arrangement 42 over the connecting line 52. Furthermore a rotational speed sensor 49 is provided that detects the rotational speed of the engine output shaft 38, generates a rotational speed signal and conducts it to the control arrangement 42 over the connecting line 51. The data of the condition of the two electrical machines 12, 36 are known to the control arrangement 42 on the basis of the electrical data of the magnitude of the condition generated by the rectifiers 40 that are connected to the control arrangement 42 over the connecting line 54. In addition a rotational speed sensor 44 is provided that detects the rotational speed and direction of rotation of the second gearbox interface 20 and thereby the rotational speed and direction of rotation of the electrical machine 12 and reports it to the control arrangement 42. The rotational speed sensor 44 is connected with the control arrangement 42 over the connecting line 45.

During power take-off shaft operation, that is with the brake 24 released, the electrical machine 12, the further electrical machine 36 and the combination gearbox 10 can be combined to an infinitely variable torque division gearbox for the power take-off shaft 14. Here the further electrical machine 36 is preferably operated as generator and the electrical machine 12 operated as an electric motor.

The brake 24 is operated by an electric control element 56. The current supply for this is provided to the electrical control element 56 from a direct current network 58 into which the electrical machine 12, 36 also supply the electrical energy they generate or from which the electrical machines 12, 36 are also supplied with electrical energy, depending on the question whether they are operated as generator or as electric motor. The electrical control element 56 is controlled by the control arrangement 42 over the connecting line 60.

The electrical machine 12 can operate as generator and thereby supply an electric device, for example, an electric device, not shown, that can be connected to an electric interface 63. The electrical interface 63 could be configured, for example, in the form of a receptacle. The interface 63 is supplied with electrical energy by a control arrangement 65 over the connecting line 67. This interface makes alternating current available to the supply which is generated by the direct current derived from the direct current network 58 by a rectifier, not shown separately, associated with the control arrangement 65. By the same token an electrical device can be connected to the electrical interface 73 configured in the form of a receptacle, that makes available direct current to the electrical device directly from the direct current network 58. Alternatively the electrical energy generated by the electric machine 12 can be conducted to a resistance brake 69 which converts it into heat. For this purpose a switch 71 is switched by the control arrangement 42 in order to connect the resistance brake 69 with the direct current network 58.

Figure 2:
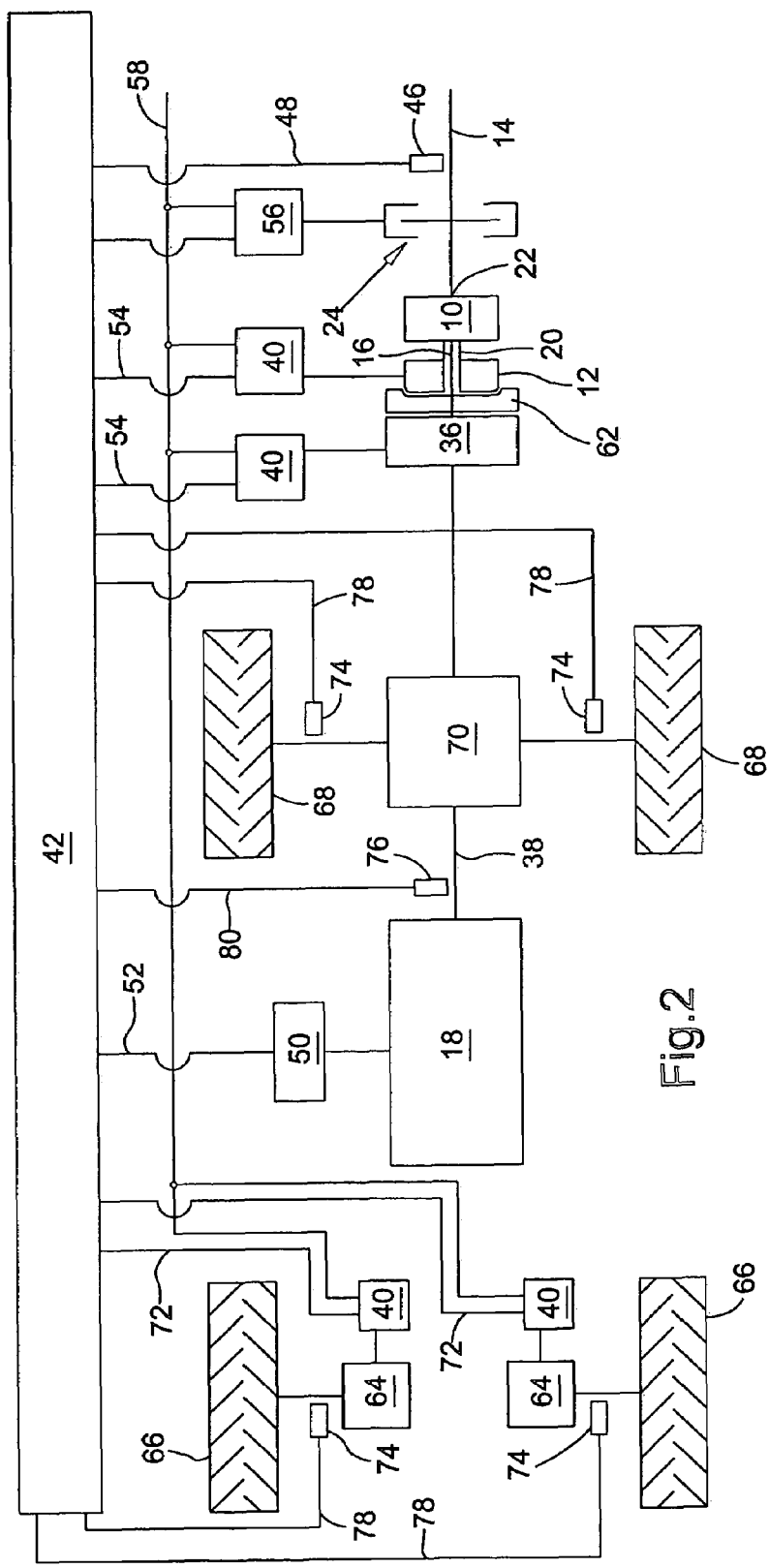
FIG. 2 is a schematic representation of a second embodiment of the present invention.

The embodiment shown in FIG. 2 shows a drive arrangement according to the invention, that is installed in an agricultural utility vehicle. In FIGS. 1 and 2 the same components are identified by the same part number callouts.

The vehicle is provided with two vehicle wheels 66 each of which is driven by an electric motor 64. The vehicle wheels 66 are vehicle wheels of a front axle of the vehicle. The electrical energy required by both motors 64 is generated either by the electrical machine 12 or by the further electrical machine 36 and is made available to the electric motors 64 over the direct current network 58 over the rectifiers 40. The rectifier 40 associated with the electric motors 64 are connected to the control arrangement 42 over the connecting lines 72. In place of the two electric motors 64 a single electric motor could also be provided, that drives both vehicle wheels of the front axle. Moreover vehicle wheels 68 of a rear axle of the vehicle are provided, that are connected with the internal combustion engine over a gearbox 70.

Besides the rotational speed sensor 46 for the power take-off shaft 14, four further rotational speed sensors 74 are provided each of which detects the rotational speed of the vehicle wheels 66 or 68. A rotational speed sensor 76 detects the rotational speed of the engine output shaft 38 and thereby the rotational speed of the internal combustion engine 18. The connecting lines 78 or 80 connect the rotational speed sensors 74 or 76 with the control arrangement 42.

In FIG. 2 the electrical machine 12 and the further electrical machine 36 are arranged side by side close to each other. Thereby both electrical machines 12, 36 can be cooled by a single cooling arrangement 62—indicated only schematically.

Figure 3:
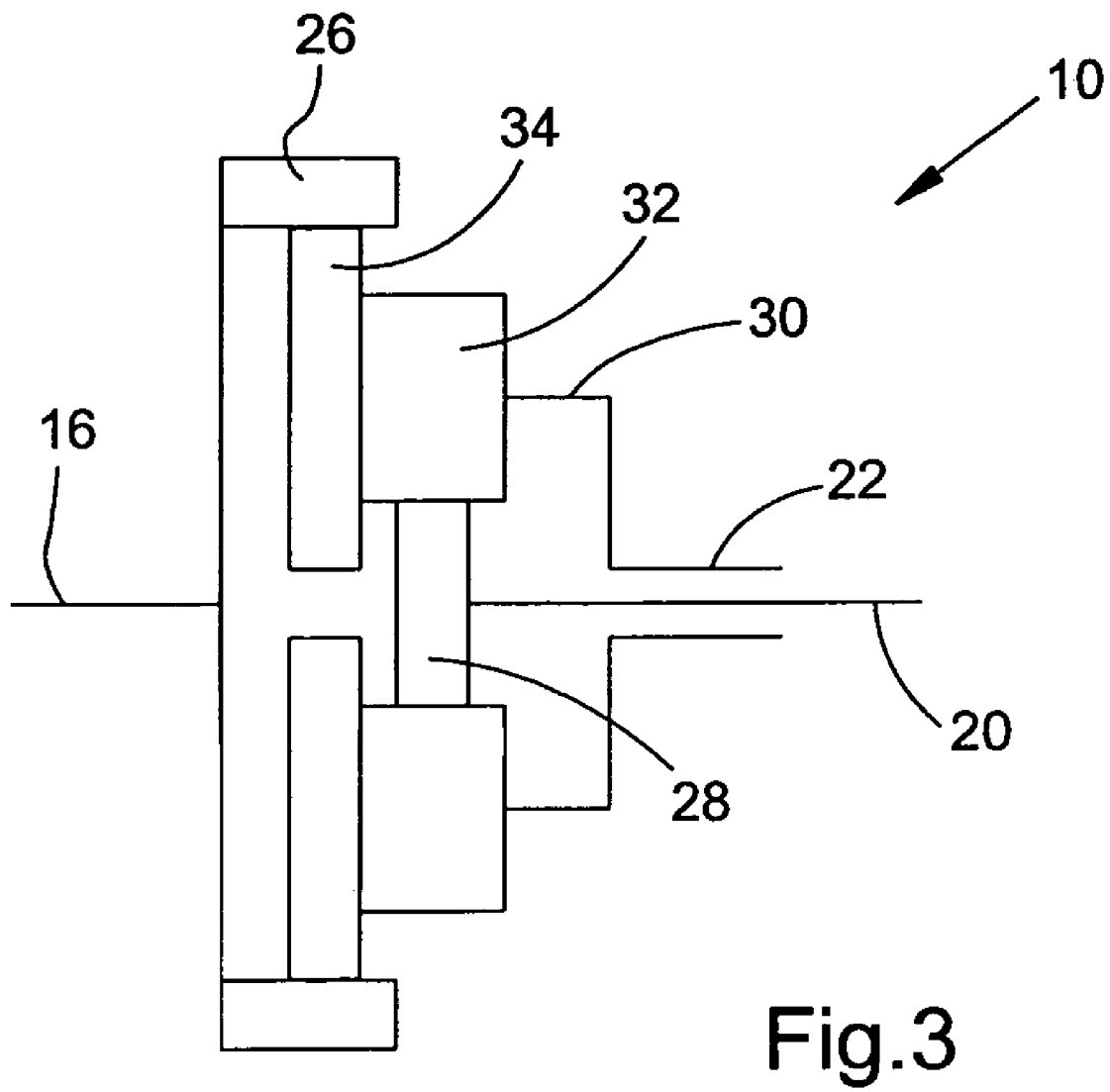
FIG. 3 is a schematic representation of an embodiment of a combination gearbox according to the present invention; and, FIG. 4 is a schematic representation of a further development of the first embodiment of the present invention.

FIG. 3 shows an embodiment of a combination gearbox 10 of the present invention. The combination gearbox 10 is configured as a planetary gearbox. The planetary gearbox includes an internal gear 26, that is driven by an internal combustion engine—not shown in FIG. 3—over the gearbox interface 16. The sun gear 28 of the planetary gearbox is connected with the electrical machine also not shown in FIG. 3. The power take-off shaft—not shown in FIG. 3—is connected to the planet carrier 30, where preferably three sets of planet gears 32, 34 are arranged on the planet carrier 30, each of which is provided with two planet gears with different diameters. The planet gears 32 with the smaller diameter mesh with the sun gear 28 and the planet gears 34 with the larger diameter mesh with the internal gear 26.

If the gear pitch diameters of the internal gear 26 to the gears 32 of smaller diameter to the gear 34 of larger diameter and to the sun gear 28 are in a proportion to each other of 27 to 6 to 9 to 12 with respect to the internal gear 26, then at a rotational speed of the internal combustion engine of +2000 revolutions per minute and with the brake 24 applied, that is, with the power take-off shaft stopped, the electrical machine is driven at a rotational speed of −3000 revolutions per minute. Therefore the electrical machine 12 is provided with a step up speed ratio relative to the internal combustion engine 18 which results in a favorable power delivery of the electrical machine 12, when it is operating as a generator.

On the other hand during power take-off shaft operation, that is, when the brake 24 is released, a power take-off shaft speed of 1000 revolutions per minute could be demanded. With a rotational speed of the internal combustion engine 18 of +2000 revolutions per minute a resulting rotational speed of the electrical machine 12 of −500 revolutions per minute is required.

Therefore the transmission of the combination gearbox 10 is designed in such a way that the rotational speeds required in the principal operating region of the power take-off shaft 14 lie in the region of optimum efficiency of the internal combustion engine 18 and that a comparably smaller proportion of power of the electrical machine 12 must be made available.

Figure 4:
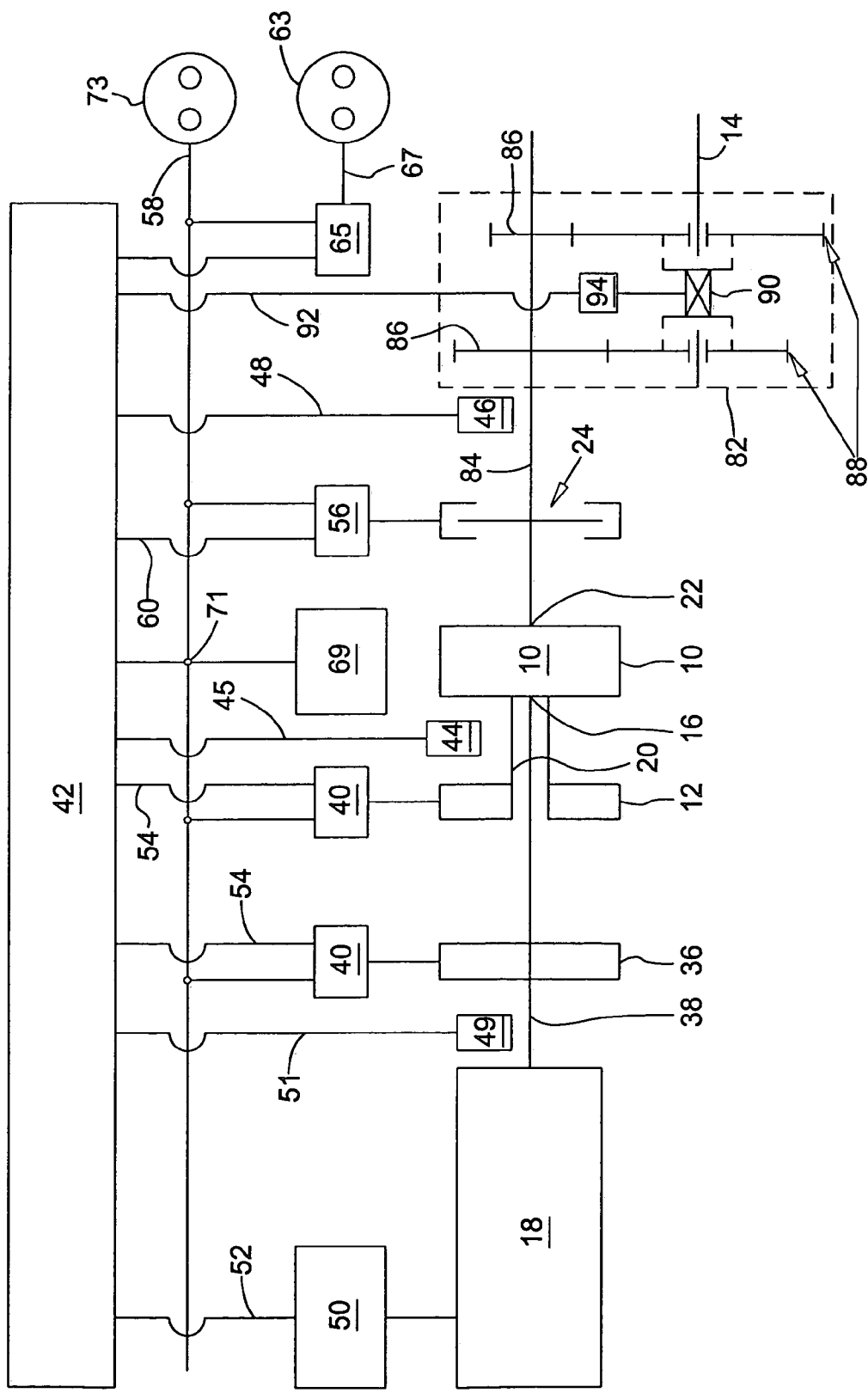

FIG. 4 shows a further development of the first embodiment according to FIG. 1, that is provided with a spur gear stage 82 which can be shifted. A shaft 84 is provided between the spur gear stage 82 and the third gearbox interface 22, which transmits the torque made available by the third gearbox interface 22 to the spur gear stage 82 that can be shifted. The spur gear stage 82 that can be shifted includes two spur gears 86 connected to the shaft 84, where the spur gear 86 shown at left is provided with a larger diameter compared to the spur gear 86 shown at right. Each of the spur gears 86 mesh with a shifted spur gear 88, where the spur gear 88 shown at left is provided with a smaller diameter than the spur gear 88 shown at right.

The shifted spur gears 88 can be shifted in corresponding manner by a control arrangement 90, so that the torque transmitted by the shaft 84 is transmitted to the power take-off shaft 14 either over the two spur gears 86, 88 shown at left or the two spur gears 86, 88 shown at right. The control arrangement 90 is controlled by the control arrangement 94 by means of the control arrangement 42 over the connecting line 92. The shifted spur gear stage 82 of FIG. 4 can also be connected with the power take-off shaft 14 of the second embodiment according to FIG. 2.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A drive arrangement for the drive of attached implements for an agricultural or industrial utility vehicle, comprising:
   a combination gearbox;
   a first electrical machine;
   a power take-off shaft providing a drive interface to drive an attached implement wherein mechanical torque is provided to the implement;
   a gearbox interface of the combination gearbox driven by an internal combustion engine;
   a second electrical machine driven directly or indirectly by the internal combustion engine;
   a brake with which the power take-off shaft can be stopped;
   a rectifier associated with each of the first electrical machine and the second electrical machines so that each of the electrical machines can be switched in both directions of rotation and both directions of torque; and,
   a control arrangement controlling the internal combustion engine, the first electrical machine, the second electrical machine, at least one rectifier and the brake;
   wherein the first electrical machine is connected with a second gearbox interface of the combination gearbox, and the power take-off shaft is connected with a third gearbox interface of the combination gearbox and wherein when the combination gearbox is driven by the internal combustion engine over the gearbox interface and the power take-off shaft is stopped by the brake, the entire mechanical energy supplied to the combination gearbox is supplied to the first electrical machine.

2. A drive arrangement according to claim 1, wherein the combination gearbox is provided with a planetary gearbox.

3. A drive arrangement according claim 1, wherein the first electrical machine and the second electrical machine can be operated as electric motors.

4. A drive arrangement according to claim 1, wherein data of the condition of the internal combustion engine, of the powertake-off shaft, of the first electrical machine and the second electrical machine can be detected by the control arrangement by way of sensors.

5. A drive arrangement according to claim 1, wherein a spur gear stage is provided between the power take-off shaft and the third gearbox interface and is configured so that it can be shifted between two different rotational speeds of the power take-off shaft.

6. A drive arrangement according to claim 1, wherein the first electrical machine and the second electrical machine can be operated as a generator.

7. A drive arrangement according to claim 6, wherein the first electrical machine and the second electrical machine are arranged close to each other in space, so that both electrical machines can be cooled by one cooling arrangement.

8. A drive arrangement according to claim 1, wherein when the brake is released, the first electrical machine, the second electrical machine and the combination gearbox can be combined to an infinitely variable torque division gearbox for the power take-off shaft.

9. A drive arrangement according to claim 8, wherein the second electrical machine can be operated as a generator and the first electrical machine can be operated as an electric motor.

* * * * *